United States Patent [19]

Kruse et al.

[11] Patent Number: 4,892,787

[45] Date of Patent: Jan. 9, 1990

[54] COATED PAPER FOR INK JET PRINTING

[75] Inventors: Jurgen M. Kruse; Donald Kimball, both of Clinton, Conn.

[73] Assignee: AM International, Inc., Chicago, Ill.

[21] Appl. No.: 83,276

[22] Filed: Aug. 10, 1987

[51] Int. Cl.[4] ........................ D21H 1/38; B32B 23/08

[52] U.S. Cl. .................................... 428/331; 428/336; 428/342; 428/514; 428/537.5

[58] Field of Search ...................... 428/37.5, 216, 331, 428/342, 514, 336

[56] References Cited

FOREIGN PATENT DOCUMENTS

| | | | |
|---|---|---|---|
| 5344566 | 11/1978 | Japan . | |
| 8044566 | 11/1978 | Japan | 428/514 |
| 0211699 | 11/1984 | Japan | 428/514 |
| 59211699 | 11/1984 | Japan . | |

OTHER PUBLICATIONS

Monsanto Material Safety Data-Scriptset ® 720 Resin; Dec., 1985.

Lyne, et al., "Paper for Ink Jet Printing", *Tappi Journal,* May, 1985, pp. 106-110.

Kaye, "Fractal Dimension and Signature Wave-Form Characterization of Fine Particle Shape", *American Laboratory,* Apr., 1986, pp. 55-63.

*Primary Examiner*—P. C. Ives

*Attorney, Agent, or Firm*—Nicholas A. Camasto; James P. Zeller

[57] ABSTRACT

Coated paper useful for ink jet printing comprises a cellulosic substrate coated with an intimate mixture of a particulate pigment with a binder comprising a mixture of an acrylic resin and polyvinyl alcohol.

23 Claims, No Drawings

COATED PAPER FOR INK JET PRINTING

BACKGROUND OF THE INVENTION

1. Field of the Invention

This invention relates generally to substrates used in printing and, more particularly, this invention relates to coated papers useful in ink jet printing.

2. Description of Related Art

In ink jet printing, uniformly shaped droplets of aqueous or solvent based dye solutions are ejected from a nozzle onto a paper or other substrate. Ejection can be continuous, where drops are selected electrostatically for imaging, or of the drop on demand type where drops are produced only when needed, thus obviating the need for electrostatic deflection.

The paper and surface chemistry requirements for good print quality vary widely and may rely on coating materials to create appropriate ink sorption characteristics.

Ink jet inks may be water-based or may have an alkylene glycol or other solvent base.

For the printing of well shaped dots by means of ink jets, and especially for multi-color printing with ink jets, the use of paper coated with a pigment is highly desirable. The pigment and the binder of the coating ideally would serve a dual function: they both sorb the solvent of the ink (i.e., dry the ink) and hold the dye-stuff of the ink on the surface of the coating to maximize the visual effect of the ink.

In order to maximize visual effectiveness, the surface area of the pigment in the coating should be high. In this way, the maximum amount of dyestuff from the ink will be in the path of light reflected from the substrate to the eye, and a minimal amount of dyestuff will be absorbed into the pigment layer or the paper substrate.

Ideally, a binder used in a paper coating should serve the functions of holding the pigment so as to reduce or eliminate dusting or chalking thereof, as ink jet printers with very fine orifice nozzles are quite susceptible to clogging. Also, the binder should help in the sorption of the solvent of the ink. If too tight a binder is used, ink will remain on the surface and will smear or even splatter when hitting the surface after ejection from the nozzle. Too weak a binder will not hold the pigment without chalking.

SUMMARY OF THE INVENTION

It is an object of the invention to provide a coated paper useful in ink jet printing and which exhibits one or more of the desirable attributes described above.

According to the present invention, a cellulosic substrate defining at least one surface is coated on that surface with a coating comprising a mixture of (i) particulate pigment and (ii) a binder comprising a mixture of acrylic resin and polyvinyl alcohol.

The pigment is present in an amount and has a surface area sufficiently high to provide a desired high rate of ink sorption. The acrylic resin of the binder holds the particulate pigment together and in adherence to the substrate surface and thus prevents thus dusting or chalking of the pigment. The polyvinyl alcohol portion of the binder, which may be formed in situ during the coating process, is effective in sorbing solvent from the ink while leaving the dyestuff from the ink on the surface of the pigment.

A method of preparing the inventive coated paper is also comprehended by the invention.

Further advantages of the invention will be apparent to those skilled in the art from a review of the following detailed description taken in conjunction with the appended claims.

DETAILED DESCRIPTION OF THE INVENTION

The present invention contemplates the coating of any of a variety of cellulosic substrates to render the substrate suitable for ink jet printing. By means of the invention, relatively low cost paper bases may be modified for use with ink jet printers. If desired, coating can be carried out by conventional means such as by air knife coating or by rod coating of a coating emulsion mixture or slurry onto the substrate. However, the coating technique is not limited, and other suitable methods can be used.

The Substrate

The substrate is a cellulosic material defining at least one surface which is coated with the inventive coating. The substrate may comprise any of a variety of papers, including wood-based and rag-based papers, such as vellums.

Some low cost papers may lack sufficient surface sizing for either the coating step or for use in ink jet printing, and thus may require preliminary impregnation with a water hold-out agent such as the styrene-maleic anhydride polymer ammonium salt available under the trademark Scriptset® 720 resin from Monsanto. This or a similar material is desirable to strengthen the substrate and to hold out water from papers which do not have sufficient internal sizing.

Those skilled in the art will appreciate that the invention is not limited to the use of low cost papers but can be applied to any of a wide variety of substrates as circumstances dictate.

The Coating Process

The inventive coating is conveniently prepared in slurry or emulsion form and then applied to the substrate by a variety of means, such as by air knife coating or rod coating. During the coating process, heat and/or pressure may be applied which in some embodiments of the invention may result in desirable chemical changes in precursor components contained in the coating-forming mixture.

When the coating is applied in slurry form, the coating process conditions result in the driving off of the solvent, which is typically water. Temperatures encountered in the coating process should be sufficiently high to evaporate the solvent at a suitable fast rate, yet not so high as to char the substrate. Temperatures higher than 250° F., and preferably 350° F., but less than about 450° F. are generally suitable. At these temperatures, precursors to polyvinyl alcohol are hydrolyzed at a rapid rate.

The Coating Mixture

The coating of the paper when ready for printing is an intimate mixture of particulate pigment with a binder mixture comprising an acrylic resin and polyvinyl alcohol. The pigment is present in an amount and has a surface area sufficiently high to provide a desired high rate of dye sorption. The acrylic resin and polyvinyl alcohol are present in respective amounts effective to minimize or eliminate chalking of the pigment and to sorb solvent from ink subsequently applied to the coating.

The Pigment

As used herein, the term "pigment" is intended to denote its common meaning in the field, i.e., any powder or easily powdered substance which may be mixed with a suitable liquid in which it is relatively insoluble.

In the present invention, the pigment is particulate, preferably having a fine particle size and high surface area.

The pigment may comprise a wide variety of materials, but silica is preferred due to its wide availability and relatively low cost. Other inorganic oxides, such as alumina, silica-alumina, and titania are suitable. Titania is especially preferred in applications wherein brightening or whitening is desirable.

The fine particle size pigment sorbs the dyestuff or other coloring agent present in the ink and provides a high surface area for presentation of indicia formed by the ink. In combination with the binder of the invention, the coating sorbs ink rapidly, prevents the pigment from dusting or chalking, and provides indicia in the form of round dots.

The pigment has a relatively high surface area which provides high reflectivity of light and good sorption of ink dyestuff on the surface. The pigment preferably has a surface area in the range of about 100 to 350 $m^2/g$, with surface areas of greater than 150 $m^2/g$ preferred and surface areas in the range of 150–300 $m^2/g$ highly preferred.

Useful silica and other pigments have average particle sizes of less than about 8 $\mu m$, preferably less than or equal to 5 $\mu m$ and highly preferably between about 2 and 5 $\mu m$.

Suitable silica or other pigments have a pH of about 6 to 9 preferably greater than 7 and highly preferably between about 7 and 8.

Several specific silicas which are commercially available have been used in the inventive composition with great success. One is a fine particle size silica available from SCM Corporation under the trademark Silcron G-100. Silcron silica has a particle size of about 3 $\mu m$, a surface area of 275 $m^2/g$ and a pH of 7. Sipernat 283 LS brand silica from Degussa has an agglomerate particle size of 5 $\mu m$, a surface area of 170 $m^2/g$ and a pH of 7.9. Sipernat 22 LS silica from PQ Corporation (a subsidiary of Degussa) has an agglomerate particle size of 4.5 $\mu m$, a surface area of 170 $m^2/g$ and a pH of 6.3.

The Binder

According to the invention, the particulate pigment is intimately mixed with a binder comprising a mixture of an acrylic resin and polyvinyl alcohol when present as a coating on the substrate. The polyvinyl alcohol may be present in the precursor coating-forming mixture as polyvinyl alcohol or, preferably, may be present in the mixture as polyvinyl acetate or a polyvinyl acetate-containing copolymer which is hydrolyzed to polyvinyl alcohol in the presence of heat and water during the coating process.

One function of the acrylic resin is to hold the pigment in place and to prevent dusting and chalking thereof. Prior art binders are too weak to effectively perform this function in some cases.

The preferred acrylic resin is available from Rohm & Haas under the trade designation Rhoplex AC-64 and is a thermoplastic acrylic resin emulsion with a 60% solids content, a pH of 9.4, contains an anionic emulsifier, and has a minimum film forming temperature of 70° C.

Other acrylic resins and vinyl acrylic resins are believed to be useful. Rohm & Haas Rhoplex B-60-A can be used to replace Rhoplex AC-64 if loss of resistance to chalking is not a concern.

The other essential component of the binder is selected to sorb the solvent of the ink, i.e. dry the ink, and to provide round dots formed by droplets of in provided from the ink jet printer. Both water-based and glycol-based inks are readily sorbed by the inventive coating. It has been found that according to the invention the presence of an effective amount of polyvinyl alcohol in the final coating accomplishes these objectives.

If desired, the aqueous coating-forming precursor mixture may be formed by mixing the pigment, the acrylic resin and polyvinyl alcohol. Suitable polyvinyl alcohols are available from Du Pont under the trade designations Elvanol 71-30 and HV, respectively. Elvanol 71-30 polyvinyl alcohol is 98% hydrolyzed, has a pH of 6, and has a medium molecular weight as measured by viscosity. Du Pont Elvanol HV polyvinyl alcohol is 99–100% hydrolyzed, has a pH of 6 and a high molecular weight as measured by viscosity. The latter material and the medium molecular weight 71–30 material are hot water soluble and thus provide excellent cold water resistance.

If desired, a polymer which hydrolyzes to polyvinyl alcohol in the presence of water and heat as encountered during the coating process may be substituted for polyvinyl alcohol in the coating-forming precursor mixture. One such type of material is a vinyl acetate-acrylic (acrylate) copolymer, preferably containing a high molar proportion (e.g., 95%) of vinyl acetate in the copolymer chain. One preferred such material is marketed by Rohm & Haas under the trade designation Rhople AR-74, comprising 95 mole percent vinyl acetate and 5 mole percent acrylate units. This is a swellable copolymer emulsion (45% solids) having a pH of 5.0.

A similar material is marketed by Fuller under the trade designation Fulatex PD 0233 and is also a vinyl acetate-acrylic copolymer having a vinyl acetate/acrylic molar ratio of 95:5. This material is commercially available in a suspension of 47 weight percent solids, pH 5.0 and a latex viscosity of 50 cps.

Another useful vinyl acetate-acrylate copolymer is available from Andrews under the trade designation VC-1.

If desired, combinations of polyvinyl acetate resins and acrylic resins may be used in the place of vinyl acetate/acrylic copolymers as polyvinyl alcohol precursors.

Vinyl acetate-acrylate copolymers are conveniently used in combination with good ink sorbents such as hydroxyethyl celluloses such as are conveniently available from Union Carbide Corporation under Cellosize® trade designations including QP 09H. This type of material effectively sorbs glycol-based or water-borne ink solvents and provides excellent dot roundness.

Coating Mixture Preparation and Application

The coating mixture which is a precursor of the final coating on the substrate is water-based and is conveniently prepared by simple mixing. Generally, a water-based mixture containing the pigment is formed followed by addition of the binder resins. The mixture can then be coated onto the substrate by any suitable method wherein the water and other solvent materials are driven off, preferably by heat. Heat applied during the coating process also serves to hydrolyze any polyvinyl acetate or other polyvinyl alcohol precursor materials present in the mixture.

The precursor mixture may contain materials in addition to the pigment, water and binder resins, such as ammonium hydroxide ($NH_4OH$) which assists in dispersing the pigment, a surfactant (wetting agent) such as Rohm & Haas Tamol QR 1124 nonionic surfactant, and an anti-foam agent such as available under the mark Foamaster DF 122 NS.

If desired, a titania brightening agent such as Titanox 2020, available from NL Industries, or another whitening agent such as Tinopal PT LQ may be added.

The following provides a number of examples of useful coating precursor solutions.

FORMULATION 1

An aqueous pigment suspension was formed by mixing the following components:

100 L: water
1.3 L: aqueous ammonia ($NH_4OH$)
100 mL: Tamol QR 1124 nonionic surfactant
40 mL: Foamaster DR 122 NS antifoam agent
25 lb: Silcron G-100 silica To this mixture were added the following binder resins, with thorough mixing:

5 L: Rhoplex AC-64 acrylic resin
2.5 L: Rhoplex AR-74 copolymer
6.5 L: Fulatex PD 0233 copolymer

FORMULATION 2

An aqueous pigment suspension was formed by mixing the following components:

100 L: water
1 L: aqueous ammonia
50 mL: Tamol QR 1124 surfactant
25 lb: Sipernat 283 LS silica
1.7 L: 50% KFS solution (Nopco antifoam)

The following binder resins were then added, with thorough mixing:

4 L: Rhoplex AC-64 acrylic resin
4 L: Rhoplex AR-74 copolymer
4 L: Fulatex PD 0233 copolymer

FORMULATION 3

The following were mixed:

100 L: water
1.2 L: aqueous ammonia
100 mL: Tamol QR 1124 surfactant
1.5 L: 50% KFS solution (antifoam)
12 kg: Silcron G-100 silica The following binder resins were added, with mixing:

11 L: Rhoplex AC-64 acrylic resin
4 L: Rhoplex AR-74 copolymer
7 L: 5% Elvanol HV polyvinyl alcohol

FORMULATION 4

This formulation was prepared exactly as described above with reference to Formulation 3, except that 9 L Rhoplex AC-64 acrylic resin and 11 L 5% Elvanol 71-30 polyvinyl alcohol were substituted for the binder resins of Formulation 3.

FORMULATION 5

An aqueous pigment suspension was formed by mixing the following components:

100 L: water
1.25 L: aqueous ammonia
100 mL: Rohm & Haas Tamol QR 1124 nonionic surfactant
40 mL: Foamaster DF 122 NS antifoam agent
25 lb: Silcron G-100 Silica
4.5 lb: Titanox 2020 titania To this mixture were added the following binder resins, with thorough mixing:

5.0 L: Rhoplex AC-64 acrylic resin
2.5 L: Rhoplex AR-74 copolymer
6.5 L: Fulatex PD 0233 copolymer In this formulation, the weight proportion of silica pigment to the remainder of the mixture was found to be important. It is critical that enough pigment be present to provide good ink sorption. However, too high a pigment concentration results in a solution which is too thick for efficient mixing.

Based on the use of 100 liters of water, the respective amounts of ammonia, surfactant, and antifoam agent may vary by ±20%. The usage rate of AC-64 resin may vary from 4 to 6 liters in the foregoing formulation. Lower concentrations result in rub-off of pigment, while higher concentrations increase viscosity without a resulting benefit. The usage of AR-74 resin is optional and may be varied from 0 to 5 liters in this formulation. The PD 0233 resin must be present in this formulation at a level of 5 to 8.5 liters. All of the foregoing binder resin amounts are based on a total of 14 liters of binder resin material. Interestingly, even though AR-74 and PD-0233 resins have identical copolymer makeup and molecular weight, etc. specifications, PD-0233 can replace AR-74 but not vice versa.

Too low a concentration of vinyl acetate-acrylic copolymer may result in poor dot shape while too high a concentration reduces the pot life of the mixture.

The following formulations are presently preferred:

FORMULATION 6

The following components were mixed:

114L: water
1.4 L: aqueous ammonia
113 mL: Tamol QR 1124 surfactant
45 mL: Foamaster DF 122 NS antifoams
30 lb: Silcron G-100 silica
5 lb: Titanox 2020 brightener
85 mL: Tinopal PT LQ whitening agent The Silcron G-100 and Titanox components were added slowly to rapidly stirred mixture in order to avoid agglomeration. Mixing was continued for 6 hours.

Prior to use, the following binder resins were added:

5.5 L: Rhoplex AC-64 acrylic resin
3 L: Rhoplex AR-74 copolymer
7.5 L: Fulatex PD 0233 copolymer Viscosity measurement using a #2 Zahn cup read 13.8 to 14.5 sec. at 74° F.

FORMULATION 7

The following were mixed together:

114 L: water
1.4 L: aqueous ammonia
113 mL: Tamol QR 1124 surfactant
45 mL: Foamaster DF 122 NS antifoam agent The following was added with rapid stirring:

30 lb: Silcron G-100 silica

Mixing was continued for 6 hours to disperse the silica. Stirring was maintained to prevent settling.

Prior to use, the following were added:

5.5 L: Rhoplex AC-64 resin

3 L: Rhoplex AR-74 copolymer 7.5 L: Fulatex PD 0233 copolymer

Viscosity measurements within the range identified with respect to Formulation 6 were obtained.

The precursor coating slurry or emulsion is applied to a substrate surface in a sufficient amount to give a final coating thickness of about 0.3 to 1.0 mil. It has been found that coating thickness is inversely related to the size of dots applied by the printer. Thus, a coating thickness of 0.3 mil typically provides dot sizes of about 8 mil, while dots of 4 mils in diameter are typically provided with a coating thickness of 1.0 mil. Thus, selection of coating thickness can be used to vary the size of dots formed thereon during printing.

Fractal dimensions of less than 1.1 and aspect ratios of less than 1.1 are exhibited by dots formed by ink jet printing on coatings made according to the preferred embodiment shown above. The coating does not chalk.

The foregoing detailed description is given for clearness of understanding only, and no unnecessary limitations should be inferred therefrom, as modifications within the scope of the invention will be apparent to those skilled in the art.

We claim:

1. A coated substrate useful in ink jet printing, comprising:

(a) a cellulosic substrate defining at least one surface coated with (b) a coating comprising an intimate mixture of (1) particulate dye-sorptive pigment having a surface area of at least 100 $m^2/g$ and an average particle size of less than about 8 $\mu m$ in an amount sufficient to provide a desired rate of dye sorption; and, (2) a binder comprising a mixture of an acrylic resin and polyvinyl alcohol in respective amounts effective to minimize or eliminate chalking of said pigment and to sorb solvent from water- or glycol-based jet printing ink applied to said coating to form round dots from droplets of said ink provided to said coating by an ink jet printer.

2. The coated substrate of claim 1 wherein said substrate of (a) is selected from the group consisting of wood-and rag-based papers.

3. The coated substrate of claim 2 wherein said substrate is impregnated with a water hold-out agent.

4. The coated substrate of claim 1 wherein said particulate pigment is selected from the group consisting of silica, alumina, silica-alumina and titania.

5. The coated substrate of claim 1 wherein said particulate pigment has a surface area in the range of about 100 to 350 $m^2/g$.

6. The coated substrate of claim 5 wherein said particulate pigment has a pH in the range of about 6 to 9.

7. The coated substrate of claim 6 wherein said pigment is silica having an average particle size of less than or equal to 5 $\mu m$, a surface area of greater than 150 $m^2/g$, and a pH of greater than or equal to 7.

8. The coated substrate of claim 7 wherein said average particle size is about 2 to 5 $\mu m$, said surface area is about 150 to 300 $m^2/g$ and said pH is about 7 to 8.

9. The coated substrate of claim 1 wherein said polyvinyl alcohol is formed in situ by hydrolysis of a polyvinyl acetate-containing precursor material during coating of said substrate surface with said coating of (b).

10. The coated substrate of claim 9 wherein said precursor material comprises a vinyl acetate-acrylic copolymer.

11. The coated substrate of claim 10 wherein said precursor copolymer comprises about 95 mole percent vinyl acetate comonomer and about 5 mole percent acrylic comonomer.

12. The coated substrate of claim 9 wherein said precursor material comprises a mixture of polyvinyl acetate and acrylic resins.

13. The coated substrate of claim 9 wherein a hydroxyethyl cellulose polymer is also present in said binder mixture.

14. The coated substrate of claim 1 wherein said coating is about 0.3 to 1.0 mil thick.

15. Coated paper useful in ink jet printing, comprising:

(a) a wood- or rag-based paper substrate defining at least one surface coated with (b) a coating about 0.3 to 1.0 mil thick comprising an intimate mixture of (1) particulate dye-sorptive pigment selected from silica, alumina, silica-alumina and titania having an average particle size of less than about 8 $\mu m$ and surface area in the range of about 100 to 350 $m^2/g$ in a sufficient amount to provide a desired rate of dye sorption; and, (2) a binder comprising a mixture of an acrylic resin and polyvinyl alcohol in respective amounts effective to minimize or eliminate chalking of said pigment and to sorb solvent from water- or glycol-based jet printing ink applied to said coating to form round dots from droplets of said ink provided to said coating by an ink jet printer, said polyvinyl alcohol being formed in situ by hydrolysis of a precursor polyvinyl acetate-containing material during coating of said substrate surface.

16. The coated paper of claim 15 wherein said substrate is impregnated with a water hold-out agent.

17. The coated paper of claim 15 wherein said particulate pigment has a pH in the range of about 6 to 9.

18. The coated paper of claim 17 wherein said pigment is silica having an average particle size of less than or equal to 5 $\mu m$, a surface area of greater than 150 $m^2/g$, and a pH of greater than or equal to 7.

19. The coated paper of claim 18 wherein said average particle size is about 2 to 5 $\mu m$, said surface area is about 150 to 300 $m^2/g$ and said pH is about 7 to 8.

20. The coated paper of claim 15 wherein said precursor material comprises a polyvinyl acetate-acrylic copolymer.

21. The coated paper of claim 20 wherein said precursor copolymer comprises about 95 mole percent vinyl acetate comonomer and about 5 mole percent acrylic comonomer.

22. The coated paper of claim 15 wherein said precursor material comprises a mixture of vinyl acetate and acrylic resins.

23. The coated paper of claim 15 wherein a hydroxyethyl cellulose polymer is also present in said binder mixture.

* * * * *